United States Patent [19]

Shaw

[11] 4,336,301
[45] Jun. 22, 1982

[54] FILLER MATERIAL

[75] Inventor: Robert B. Shaw, Houston, Tex.

[73] Assignee: Shell Oil Company, Houston, Tex.

[21] Appl. No.: 198,509

[22] Filed: Oct. 20, 1980

[51] Int. Cl.$^3$ .................. B32B 5/16; B32B 19/00
[52] U.S. Cl. ............................ 428/323; 264/110;
427/256; 428/325; 428/327; 428/403; 428/404;
428/406; 428/407; 521/57
[58] Field of Search ............ 264/110; 428/144, 145,
428/403, 404, 406, 407, 324, 323, 325, 327;
521/57; 427/256

[56] References Cited

U.S. PATENT DOCUMENTS

| | | | |
|---|---|---|---|
| 3,822,141 | 7/1974 | Kaufman | 428/404 |
| 3,846,366 | 11/1974 | Wallace | 260/37 EP |
| 3,878,281 | 4/1975 | Nitzsche et al. | 264/110 |
| 3,960,771 | 6/1976 | Tanaka et al. | 428/404 |
| 4,072,537 | 2/1978 | Kurrle | 428/404 |
| 4,112,036 | 9/1978 | Woodhams et al. | 264/110 |
| 4,175,158 | 11/1979 | Saunders | 428/406 |
| 4,201,833 | 5/1980 | Kirsch et al. | 428/404 |

Primary Examiner—William J. Van Balen
Attorney, Agent, or Firm—Dean F. Vance

[57] ABSTRACT

A filler material for thermoplastic polymers which increases the flexural modulus of the resulting filled system along with increasing the percent elongation to fracture is prepared by mixing a major amount of a mica-like, mineral sheet silicate and a minor amount of an additive such that the resulting surface of the sheet silicate possesses protrusions or nodules.

15 Claims, 2 Drawing Figures

FILLER MATERIAL

BACKGROUND OF THE INVENTION

1. Field of the Invention

This invention relates generally to fillers for thermoplastic polymeric systems. More particularly, this invention relates to a modified filler based on a mica-like mineral sheet silicate.

2. The Prior Art

Thermoplastic polymers are finding an increasing number of uses, especially as structural materials. These thermoplastic polymers are especially attractive as replacements for metals because of the reduction in weight that can often be achieved, as for example, in automotive applications. However, for a particular application, the thermoplastic polymer by itself may not offer the combination of properties desired and, therefore means to correct this deficiency are of interest. In order to increase the rigidity and strength of thermoplastic polymers, it is a common practice to incorporate a quantity of filler, natural or synthetic, in the form of fibers or flakes. When the mixture of polymer and flakes is injection molded into a sheet form, the flow causes the particles of filler to line up parallel to the sheet. If the particles have a high aspect ratio and have a high rigidity and strength, they will then constitute an effective reinforcement in the direction of alignment. Nevertheless, some flakes will become bent during the molding process. However, if the flakes are very strong, then the original aspect ratio will be retained. Further, in most cases the surfaces of the flakes are not coupled, i.e., chemically cross-linked to the polymer, and the bond may be weak.

There are important filler/polymer combinations where no practical means is available to affect a graft at the interface, e.g., a polypropylene/mica flake blend. In such a case a new approach is needed, especially to improve the mechanical properties of the filled polymer system. The present invention constitutes a new method resulting in a significant improvement in the reinforcement efficiency irrespective of whether or not a coupling agent is incorporated into the composite.

SUMMARY OF THE INVENTION

When the bond at the polymer/filler interface in a filled polymeric system is weak, and the filler is a strong fiber or flake, one can observe on the fracture surface of a tensile test specimen that flakes have "pulled out" of the matrix in which they had been embedded. This is especially true where the filler has surfaces that are very smooth and parallel, such as with fillers like mica, vermiculite, montmorillonite and talc. These smooth, parallel surfaces lead to a low resistance to "pulling out" of the flake. The present invention constitutes a method to reduce "pull out" by introducing on the surface of the flake an array of bumps or protrusions or nodules which will serve the same purpose as the protrusions found on reinforcing steel rods in concrete, viz., to prevent "pull out". In particular, the present invention constitutes a filler material for thermoplastic polymers prepared by mixing a major amount of a mica-like, mineral sheet silicate and a minor amount of an additive at a temperature above the melting point of said additive, followed by cooling the resulting mixture, therein forming protrusions of a microscopic size on the surfaces of said sheet silicate. As shown in the Illustrative Embodiments which follow, the filled systems according to the present invention not only increase the flexural modulus of the composite, but also show a marked increase in elongation to fracture when compared with similar blends of polymer and non-modified fillers. Of some significance, the increase in ductility of the composites according to the invention was an unexpected and unobvious property improvement.

DETAILED DESCRIPTION OF THE INVENTION

Figure 1:
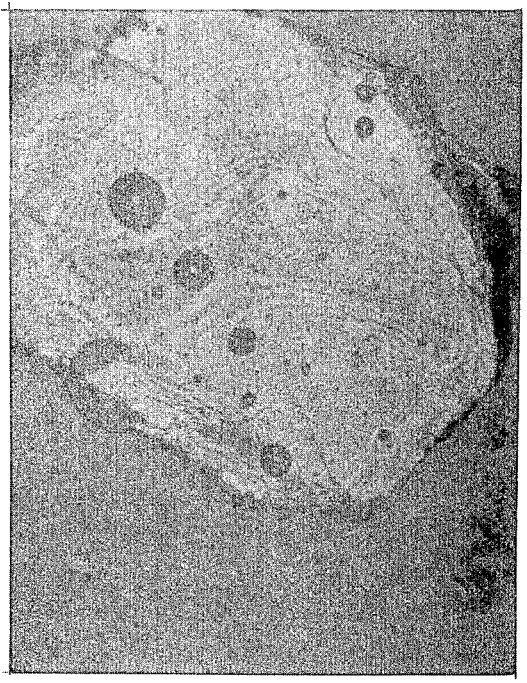
FIG. 1 is a photomicrograph at 160 X magnification revealing nodules of epoxy resin on the surface of the mica flake.

An essential component of the present invention is the mica-like, mineral sheet silicate. Specific examples of such materials include mica, vermiculite, montmorillonite, and talc. The mica contemplated herein includes both natural and synthetic mica. Examples of natural mica include phlogopite, muscovite and biotite. Examples of synthetic mica include fluorophlogopite and barium disilicic. The chemical structure and description of mica is further described in Kirk-Othmer, "Encyclopedia of Chemical Technology", Second Edition, Volume 13, pages 398 et seq, and in Theng, "The Chemistry of Clay-Organic Reactions", John Wiley & Sons Publishers, pages 1–16 (1974). Vermiculite and montmorillonite are somewhat similar in structure and are also described in the above book passage by Theng. Talc, which is a high magnesium silicate, is described in Kirk-Othmer, "Encyclopedia of Chemical Technology", Second Edition, Volume 19, pages 608 et seq.

The above-mentioned silicates have a number of properties in common. For one, they all possess a high aspect ratio. Typical aspect ratios (defined as the ratio of the longest dimension of the particle divided by the shortest dimension) are between about 2 to about 100. The silicates may also be described as being "platey" or "sheet-like". The surfaces of these silicates are typically smooth and flat. Another property of these sheet silicates is a high melt temperature. Still further, these sheet silicates are characterized by high strength and elastic modulus parallel to the plane of the sheet.

Of the above mentioned mineral sheet silicates, the preferred sheet silicate is mica because of a good combination of properties (high modulus, thermal stability, etc.) and availability of abundant source of material at economical prices.

The other essential component of the present invention is the additive material to be attached to the surface of the sheet silicate. Preferred additives meet the following requirements:

(a) they have a melting point well below the decomposition point of the sheet silicate, (b) they have a contact angle (defined as the internal angle within and near the edge of a droplet of additive) such that said additive wets and adheres to the surface of the sheet silicate, and (c) they form a solid material upon cooling from the melt. As for the contact angle of the additive, this should be less than about 120° in order to wet the surface of the sheet silicate and therefore adhere to the surface.

A number of additives are suitable herein, including epoxy resins, pulverized glass, glass beads, nylons, polycarbonates, and polyphenylene oxide.

The epoxy resin (or polyepoxide) includes those compounds possessing one or more vic-epoxy groups, i.e. one or more

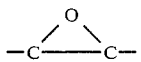

groups. These polyepoxides are saturated or unsaturated, aliphatic, cycloaliphatic, aromatic or heterocyclic, and are substituted, if desired, with non-interfering substituents, such as halogen atoms, hydroxyl groups, ether radicals, and the like. Polyepoxides employed are monomeric or polymeric. Preferred polyepoxides include the so-called liquid glycidyl polyethers of polyhydric phenols and polyhydric alcohols. Especially preferred are the glycidyl polyethers of 2,2-bis(4-hydroxyphenol)propane having an average molecular weight between about 300 and about 900 and an epoxide equivalent weight of between about 140 and about 500. A specific commercially available epoxy resin contemplated herein is Shell Chemical Company EPON® resin.

Various examples of polyepoxides that may be used in this invention are given in U.S. Pat. No. 3,408,422 and it is to be understood that so much of the disclosure of that patent relative to examples of polyepoxides is incorporated by reference into this specification.

Various types of glass are contemplated herein, including soda, soda-lime and boro-silicate glasses. In a preferred embodiment, the glass composition will fulfill the following requirements:

(1) The thermal coefficient of expansion of the glass should be slightly less than or equal to the coefficient of expansion of the silicate flake, measured parallel to the cleavage plane.

(2) The glass should form a strong bond with the silicate. The preferred contact angle of a fused glass droplet on the silicate should lie in the range of about 80°–90°, but could be as high as 120° or as low as 20°.

(3) The fusion temperature should be low but not below about 350°. Chemical components of the glass should be low in cost. No toxic materials should be introduced.

The first two requirements insure that glass protrusions remain intact during processing of a composite, and that the residual (thermal contraction) stresses in the flake are compressive in nature. A high contact angle insures that the protrusions project the maximum practical height about the surface. The third requirement helps to insure economic feasibility.

In a preferred embodiment, the glass composition should also be amenable to phase separation through heat-treatment and leaching to produce porous glass surfaces. This requirement permits incorporation of a novel feature, viz., to render the surface of the glass protrusions porous on a microscale and thus provide a mechanism for polymer-filler adhesion. Glasses suitable for phase separation are disclosed in U.S. Pat. Nos. 3,513,106 and 2,106,744.

The glass may be employed in the form of pulverized glass or glass beads (microspheres). Average particle diameters are typically less than about 100 microns, preferably about 1 to about 50 microns. (1 micron equals $10^{-3}$ millimeter)

Table 1 shows tabulated values for the linear coefficient of thermal expansion of micas measured parallel to the cleavage plane, while Table 2 shows comparable values for various inorganic glasses.

TABLE 1

PHLOGOPITE MICAS

Coefficient of Linear Thermal Expansion Parallel to Cleavage Plant

| | | | | |
|---|---|---|---|---|
| (1) | Muscovite | $K_2Al_4(Al_2Si_6 O_{20})(OH)_4$ | 8–9 $10^{-6}$/°C. | U.S.B.M. Bull 647 |
| (2) | Phlogopite | $K_2Mg_6(Al_2Si_6 O_{20})(OH)_4$ | 13–14.5 $10^{-6}$/°C. | " |
| (3) | Synthetic Fluoro-Phlogopite | $K_2Mg_6(Al_2Si_6 O_{20}) F_4$ | 10–11.5 $10^{-6}$/°C. | " |
| (4) | Phlogopite | Wards Establishment | 12.1 $10^{-6}$/°C. | This work |
| (5) | Suzorite | $K_2Mg_{4.32}Fe_{1.16}Al_{.38}(Al_{2.25}Si_{5.75}O_{20})(OH)_2 F_2$ | 10.2 $10^{-6}$/°C. | This work |

TABLE 2

INORGANIC GLASS
Linear Coefficient of Linear Thermal Expansion

| | Name | Composition/Wt % | | | | | | | Coefficient of Thermal Exp. |
|---|---|---|---|---|---|---|---|---|---|
| | | $SiO_2$ | $Al_2O_3$ | MgO | CaO | $Na_2O$ | $K_2O$ | $B_2O_3$ | |
| (1) | Kerr Bottle Glass | 72.8 | 2.02 | | 10.77 | 13.34 | 0.26 | | 8.4 . $10^{-6}$/°C. |
| (2) | 3M Glass Beads | 72.8 | 0.45 | 3.57 | 9.0 | 13.53 | 0.11 | | 10.1 . $10^{-6}$/°C. |
| (3) | Sodium Boro-Silicate Glass | 70 | | | | 5.5 | | 24.5 | 3.7 . $10^{-6}$/°C. |
| (4) | Soda-Lime Glass | 70 | | | 10 | 20 | | | 11.1 . $10^{-6}$/°C. |

The other above-mentioned additives are solid in nature and are readily available commercial polymers.

Preferred additives are inorganic glass and organic epoxy resin, with the former being particularly preferred.

The relative amounts of silicate sheet material and additives are not critical. Preferred ranges are listed below:

|  | Silicate Sheet Material, parts by weight | Additive, parts by weight |
|---|---|---|
| Preferred | 100 | 1 to 50 |

The resulting additive protrusions should be distributed over the surfaces of the sheet silicates and will be microscopic in size, i.e., the protrusions should be considerably smaller than the largest dimension of a silicate flake, and will have average diameters of about 1 micron to about 50 microns.

The modified fillers of the present invention are prepared by mixing a major amount of the sheet silicate flakes and a minor amount of the additive particulate and raising the temperature above the melting point of the additive. Further, the mixing temperature should not be above the decomposition temperature of the sheet silicate. When the additive is glass microspheres and the sheet silicate is mica, preferred mixing temperatures are about 450° C. to about 850° C., more preferably about 600° C. to about 850° C.

When the additive is an epoxy resin, it has been found that a preferred mixing sequence is to first mix the solid epoxy resin particulate and sheet silicate flakes to a temperature slightly above the melting point of the epoxy resin and to hold the mixture at that temperature for a period to obtain a partial cure or crosslinking of the resin. In this manner, the resin will not be as likely to wet and spread over large portion of the surface of the sheet silicate and will more likely form protrusions or nodules on the surface. After a partial cure has been affected, the temperature may then be raised to affect a complete cure.

The cooling of the hot mixture of additive and sheet silicate results in the solidification of the additive in the form of microscopic nodules or protrusions on the surfaces of the sheet silicate. Cooling to ambient temperatures is typical.

While it is not necessary to add additional grafting agents to the mixture, the addition of such grafting agents is contemplated in the present invention. For example, grafting agents such as sodium or potassium silicate or a B-stage epoxy resin may be added. When the additive employed is particulate glass, certain grafting agents such as sodium silicate containing zinc or calcium oxide may be useful to bond the glass particles to the surface of the sheet silicate.

The modified fillers of the present invention are useful in blends with various thermoplastic polymers. Thermoplastic polymers contemplated herein include, without limitation, polystyrene-based polymers, copolymers, and graft copolymers, polyolefin-based polymers and copolymers, nylons, poly(ethylenes terephthalate), poly(butylene terephthalate), acrylonitrile-butadiene-styrene terpolymers and PVC. Preferred thermoplastic polymers are the polyolefins such as polyethylene, polypropylene, poly(butene-1) and the like. A much preferred polymer is isotactic polypropylene. The filled polymer systems contemplated herein may comprise about 1 to about 50 percent by weight modified fillers, preferably about 3 to about 20 percent by weight.

These polymer blend systems may be compounded further with other polymers, oil, fillers, reinforcements, antioxidants, stabilizers, fire retardants, antiblocking agents and other rubber and plastic compounding ingredients without departing from the scope of this invention.

The invention is further illustrated by reference to the following Illustrative Embodiments, which are given for the purpose of illustration only and are not meant to limit the invention to the particular reactants and conditions employed therein.

Illustrative Embodiment I

In Illustrative Embodiment I a mixture of mica flakes and an epoxy resin powder were employed. The mica was Suzorite® Mica 60-H, a phlogophite mica from Marietta Resources Int. The epoxy resin was a type of B-stage Shell Chemical EPON® resin used normally to provide solventless coatings.

About 100 parts by weight of the mica and 10 parts by weight of the solid particulate epoxy resin were milled together for a few minutes until they were intimately mixed. Next, the mixture was heated to a temperature of about 85° C. which caused the particles of resin to melt and wet the mica surface, but not to spread over the mica surface. The mixture was then treated with a 1% aqueous solution containing an epoxy silane having the tradename Union Carbide A-186, a beta (3,4 epoxy cyclohexyl)ethyltrimethoxysilane, and dried in a vacuum oven at 80° C. overnight. The mixture next was heated to 125° C. for an hour to "set" the epoxy resin droplets in order to retain their hemispherical shape. Complete cure was performed at 200° C. The resulting modified mica was then cooled to ambient temperature. A photomicrograph at 160 X magnification is included as FIG. 1 and reveals the nodules of epoxy resin on the surface of the mica flake. In an alternate treatment the epoxy silane was introduced after the 200° C. cure of the B-staged epoxy resin.

Illustrative Embodiment II

Figure 2:
FIG. 2 is a photomicrograph at 160 X magnification revealing nodules of glass on the surface of the mica flake.

In Illustrative Embodiment II, about 100 parts of Suzorite Mica 60-H flakes were milled with 28 parts by weight of glass microspheres. These glass microspheres were 3M company glass beads 380–5005, measured less than about 50 microns in diameter, and had the composition shown in Table 1. The uniform mixture was heated to 845° C. for a few minutes to melt the glass microspheres, which then attached themselves to the mica surface by liquid wetting of the surface. The resulting modified mica was cooled to ambient temperature and a photomicrograph (FIG. 2) was taken of one flake at 160 times magnification. The hemispherical nodules of glass on the surface of the mica are clearly evident.

Illustrative Embodiment III

In Illustrative Embodiment III, the modified mica flakes from Illustrative Embodiments I and II were formulated with Shell polypropylene grade 5520 and the various flexural modulus and tensile stress-strain tests were performed at 25° C. on injection molded samples. The results are presented below in Table 3:

TABLE 3

| | Run Number and Type | % Vol. Mica | Flex Modulus psi | Ultimate Tensile Strength psi | % Elongation to Fracture |
|---|---|---|---|---|---|
| 1 | Polypropylene - No Filler (Shell 5520) | 0 | $2 \times 10^5$ | 3100 | No Break |
| 2 | Plain Mica (Suzorite 60-H) | 16 | $9 \times 10^5$ | 2600 | 3 |
| 3 | Plain Mica (Suzorite 60-H) | 20 | $11.5 \times 10^5$ | 2600 | 1 |
| 4 | Knobby Mica (EPON Resin Powder on Suzorite 60-H) | 20 | $8.9 \times 10^5$ | 2880 | 5.3 |
| 5 | Knobby Mica (Glass Protrusions on Suzorite 60-H) | 16 | $6.2 \times 10^5$ | 2560 | 19.5 |

By comparing run 1 to runs 2 and 3, it can be seen that the addition of plain, non-modified mica to polypropylene significantly increased the flexural modulus. However, the elongation to fracture for the plain mica-containing blends was very low. By comparing run 3 with run 4 and run 5 with run 2, it is seen that flex-modulus and ultimate tensile strength both remained very high, but unexpectedly, the elongation to break was dramatically improved. While one skilled in the art would expect the mica and modified mica to increase the flex-modulus and ultimate tensile strength of a polymer composite, one skilled in the art would not expect an improvement in ductility as evidenced by the five-fold or greater increase in elongation to fracture for the composites of the present invention (runs 4 and 5) over the composites of the prior art (runs 2 and 3).

What is claimed is:

1. A filler material for thermoplastic polymers comprising a mica-like, mineral sheet silicate having attached on a minor portion of the surfaces of said sheet silicate microscopic-size protrusions of a solid additive, wherein said additive has:
    (a) a melting point below the decomposition point of said sheet silicate,
    (b) a contact angle such that said additive wets the surface of said sheet silicate, and
    (c) said additive upon cooling from a melt forms a solid material.

2. The filler according to claim 1 wherein said sheet silicate is selected from the group consisting of montmorillonite, vermiculite, mica and talc.

3. The filler according to claim 2 wherein said sheet silicate is mica.

4. The filler according to claims 1 or 2 wherein said additive is glass in the form of glass beads.

5. The filler according to claim 4 wherein the thermal coefficient of expansion of said glass is slightly less than or equal to the thermal coefficient of expansion of said sheet silicate, measured parallel to the cleavage plane of said sheet silicate.

6. The filler of claim 5 wherein said glass is soda-lime glass.

7. The filler according to claims 1 or 2 wherein said additive is an epoxy resin.

8. A filler polymeric material comprising a thermoplastic polymer and the filler material of claim 1.

9. The filled polymeric material of claim 8 wherein said thermoplastic polymer is selected from the group consisting of polystyrene, polyethylene, polypropylene, polybutene-1, nylon, poly(ethylene terephthalate), and copolymers thereof.

10. The filled polymeric material of claim 9 wherein said thermoplastic polymer is polypropylene.

11. A filler material for thermoplastic polymers prepared by mixing a major amount of a mica-like, mineral sheet silicate and a minor amount of an additive at a temperature above the melting point of said additive, followed by cooling the resulting mixture, therein forming microscopic protrusions on the surfaces of said sheet silicate.

12. The filler material of claim 11 wherein said sheet silicate is selected from the group consisting of montmorillonite, vermiculite, mica and talc.

13. The filler material of claim 12 wherein said sheet silicate is mica.

14. The filler material of claims 11 or 12 wherein said additive is an epoxy resin.

15. The filler material according to claim 14 wherein said additive, and said sheet silicate are mixed together at an initial temperature between the melting point of said additive and 50° C. above the melting point of said additive for time sufficient to at least partially cure said additive, after which the mixing temperature is raised to a temperature between about 10° C. and about 150° C. above said melting point until the additive curing is complete, after which the resulting filler material is cooled.

* * * * *